US012762060B2

(12) United States Patent
Tiwari et al.

(10) Patent No.: US 12,762,060 B2
(45) Date of Patent: Oct. 13, 2026

(54) PREFETCHER WITH OUT-OF-ORDER FILTERED PREFETCHER TRAINING QUEUE

(71) Applicant: SiFive, Inc., Santa Clara, CA (US)

(72) Inventors: Binayak Tiwari, San Mateo, CA (US); Benoy Alexander, Cedar Park, TX (US); John Ingalls, Sunnyvale, CA (US); Mohit Gopal Wani, San Mateo, CA (US)

(73) Assignee: SiFive, Inc., Santa Clara, CA (US)

( * ) Notice: Subject to any disclaimer, the term of this patent is extended or adjusted under 35 U.S.C. 154(b) by 0 days.

(21) Appl. No.: 18/758,994

(22) Filed: Jun. 28, 2024

(65) Prior Publication Data

US 2024/0354253 A1 Oct. 24, 2024

Related U.S. Application Data

(63) Continuation of application No. PCT/US2022/051142, filed on Nov. 29, 2022.

(60) Provisional application No. 63/295,617, filed on Dec. 31, 2021.

(51) Int. Cl.
*G06F 12/0862* (2016.01)

(52) U.S. Cl.
CPC .... *G06F 12/0862* (2013.01); *G06F 2212/602* (2013.01)

(58) Field of Classification Search
None
See application file for complete search history.

(56) References Cited

U.S. PATENT DOCUMENTS

| | | | | |
|---|---|---|---|---|
| 2012/0072702 | A1* | 3/2012 | Pierson | G06F 12/0862 712/E9.033 |
| 2015/0278100 | A1 | 10/2015 | Sundaram et al. | |
| 2016/0019155 | A1 | 1/2016 | Radhakrishnan et al. | |
| 2018/0329821 | A1 | 11/2018 | Brekelbaum et al. | |
| 2018/0329823 | A1* | 11/2018 | Brekelbaum | G06F 12/0811 |
| 2020/0133863 | A1 | 4/2020 | Pusdesris et al. | |
| 2021/0096861 | A1* | 4/2021 | Wang | G06F 9/30047 |

OTHER PUBLICATIONS

International Search Report for Application No. PCT/US2022/051142, mailed Apr. 19, 2023, 3 pages.
International Preliminary Report on Patentability for Application No. PCT/US2022/051142, mailed Jul. 11, 2024, 7 pages.
International Search Report and Written Opinion for Application No. PCT/US2022/051142, mailed Apr. 19, 2023, 9 pages.

* cited by examiner

*Primary Examiner* — Baboucarr Faal
(74) *Attorney, Agent, or Firm* — Kilpatrick Townsend & Stockton LLP

(57) ABSTRACT

Described is a system and method for implementing a prefetcher with an out-of-order filtered prefetcher training queue. A processing system includes a prefetcher and a prefetcher training queue connected to the prefetcher. The prefetcher training queue configured to receive one or more demand requests from one or more load-store units, allocate a prefetcher training queue entry for a non-duplicative demand request, and send, to the prefetcher, a stored demand request together with a hit or miss indicator, wherein the prefetcher training queue sends stored demand requests without regard to program order.

20 Claims, 5 Drawing Sheets

PREFETCHER WITH OUT-OF-ORDER FILTERED PREFETCHER TRAINING QUEUE

CROSS-REFERENCES TO RELATED APPLICATIONS

This application is a continuation of International Application No. PCT/US2022/051142, filed Nov. 29, 2022, which claims priority to U.S. Provisional Application No. 63/295,617, filed Dec. 31, 2021, the entire contents of which are incorporated herein by reference for all purposes.

FIELD OF TECHNOLOGY

This disclosure relates to prefetchers and in particular, a filtered prefetcher training queue with out-of-order processing.

BACKGROUND

Processing systems use parallel processing to increase system performance by executing multiple instructions at the same time. A prefetcher is used to retrieve data into a cache memory prior to being used by a core, to improve the throughput of the core. The prefetcher performs accesses to memory based on patterns of demand requests or data accesses made by the core. The prefetcher is trained to determine the patterns from the demand requests.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION OF THE INVENTION

Figure 1:
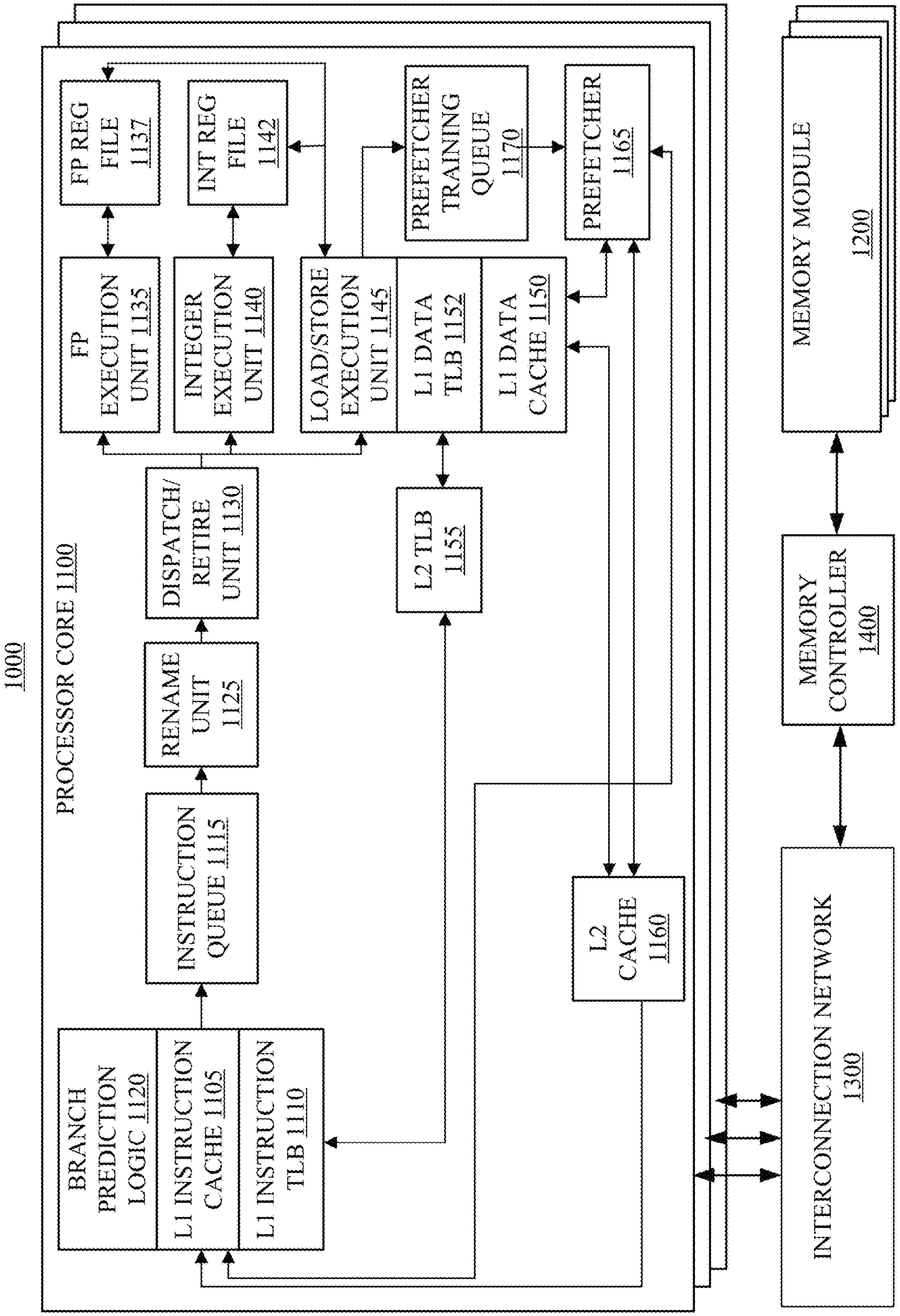
FIG. 1 is a block diagram of an example of a processing system for implementing a prefetcher with a filtered prefetcher training queue in accordance with embodiments of this disclosure.

Described herein is a system and method for implementing a prefetcher with an out-of-order filtered prefetcher training queue.

In an aspect, one or more load-store units (LSUs) send or provide demand requests to a prefetcher training queue. In some implementations, multiple demand requests are provided in one clock cycle. The prefetcher training queue determines whether a received demand request matches any of the demand request entries in the prefetcher training queue. Matching or duplicative received demand requests are filtered out and deleted. An entry in the prefetcher training queue is allocated for a new or non-duplicative received demand request. The prefetcher training queue sends or forwards a demand request entry to the prefetcher. The forwarded demand request entry is retained in the prefetcher training queue subject to a prefetcher training queue replacement algorithm. The prefetcher training queue operates, functions, or processes actions, such as, entry allocation and forwarding of the demand requests, without regard to program order. Actions are processed as input is received. That is, the prefetcher training queue implements out-of-order processing.

These and other aspects of the present disclosure are disclosed in the following detailed description, the appended claims, and the accompanying figures.

As used herein, the terminology "processor or processing system" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

The term "circuit" refers to an arrangement of electronic components (e.g., transistors, resistors, capacitors, and/or inductors) that is structured to implement one or more functions. For example, a circuit may include one or more transistors interconnected to form logic gates that collectively implement a logical function. For example, the processor can be a circuit.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices and methods shown and described herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

It is to be understood that the figures and descriptions of embodiments have been simplified to illustrate elements that are relevant for a clear understanding, while eliminating, for the purpose of clarity, many other elements found in typical processors. Those of ordinary skill in the art may recognize that other elements and/or steps are desirable and/or required in implementing the present disclosure. However, because such elements and steps do not facilitate a better understanding of the present disclosure, a discussion of such elements and steps is not provided herein.

FIG. 1 is a block diagram of an example of a processing system 1000 for implementing a prefetcher with an out-of-order filtered prefetcher training queue in accordance with embodiments of this disclosure. The processing system 1000 can implement a pipelined architecture. The processing system 1000 can be configured to decode and execute instructions of an instruction set architecture (ISA) (e.g., a RISC-V instruction set). The instructions can execute speculatively and out-of-order in the processing system 1000. The processing system 1000 can be a compute device, a microprocessor, a microcontroller, or an IP core. The processing system 1000 can be implemented as an integrated circuit. The processing system 1000 can implement the methods or techniques described herein.

The processing system 1000 includes at least one processor core 1100. The processor core 1100 can be implemented using one or more central processing unit (CPUs). Each processor core 1100 can be connected to one or more memory modules 1200 via an interconnection network 1300 and a memory controller 1400. The one or more memory modules 1200 can be referred to as external memory, main memory, backing store, coherent memory, or backing structure.

Each processor core 1100 can include a L1 instruction cache 1105 which is associated with a L1 translation lookaside buffer (TLB) 1110 for virtual-to-physical address translation. An instruction queue 1115 buffers up instructions fetched from the L1 instruction cache 1105 based on branch prediction logic 1120 and other fetch pipeline processing. Dequeued instructions are renamed in a rename unit 1125 to avoid false data dependencies and then dispatched by a dispatch/retire unit 1130 to appropriate backend execution units, including for example, a floating point execution unit 1135, an integer execution unit 1140, and a load/store execution unit 1145. In some implementations, the load/store execution unit 1145 is multiple load/store execution units with multiple load/store execution pipelines for providing demand requests. In some implementations, the load/store execution unit 1145 includes multiple load/store execution pipelines for providing demand requests. In some implementations, the demand requests are data requests, demand load requests, demand store requests, and the like. The floating point execution unit 1135 can be allocated physical register files, FP register files 1137, and the integer execution unit 1140 can be allocated physical register files, INT register files 1142. The FP register files 1137 and the INT register files 1142 are also connected to the load/store execution unit 1145, which can access a L1 data cache 1150 via a L1 data TLB 1152, which is connected to a L2 TLB 1155 which in turn is connected to the L1 instruction TLB 1110. The L1 data cache 1150 is connected to a L2 cache 1160, which is connected to the L1 instruction cache 1105.

The load/store execution unit 1145 is connected to a prefetcher 1165 via a prefetcher training queue 1170. In some implementations, the prefetcher 1165 is a hardware prefetcher. The prefetcher training queue 1170 can buffer multiple demand requests for training the prefetcher 1165. Missing a training event, i.e., a demand request, is minimized, mitigated, or avoided. In some implementations, the prefetcher training queue 1170 includes N entries for demand requests. In some implementations, the prefetcher training queue 1170 includes 8 entries for demand requests. The prefetcher 1165 is connected to the L1 data cache 1150, the L1 instruction cache 1105, the L2 cache 1160, and other caches, which can provide hit and miss indicators to the prefetcher training queue 1170 when a demand request hits or misses a cache, respectively.

The processing system 1000 and each element or component in the processing system 1000 is illustrative and can include additional, fewer or different devices, entities, element, components, and the like which can be similarly or differently architected without departing from the scope of the specification and claims herein. Moreover, the illustrated devices, entities, element, and components can perform other functions without departing from the scope of the specification and claims herein. As an illustrative example, reference to a data cache includes a data cache controller for operational control of the data cache.

Operationally, the load/store execution unit 1145 can send or provide one or more demand requests to the prefetcher training queue 1170 and to a cache as appropriate and applicable. In some implementations, multiple demand requests are provided in one clock cycle. The prefetcher training queue 1170 includes a filter mechanism which determines whether a received demand request matches a demand request which is stored in an entry in the prefetcher training queue 1170. The filtering mechanism can use one or more characteristics of a cache line, including but not limited, such as an address, to match demand requests. The filtering prevents the prefetcher 1165 from excessive training with respect to a cache line over multiple cycles. The filtering can reduce the size of the prefetcher training queue 1170 needed for effective prefetcher training. Matching or duplicative received demand requests are filtered out and deleted. The prefetcher training queue 1170 can allocate an entry for a new or non-duplicative received demand request.

The prefetcher training queue 1170 can receive hit or miss indicators from the appropriate and applicable caches for the stored demand requests. The prefetcher training queue 1170 releases, sends, or forwards a demand request entered in the prefetcher training queue 1170 to the prefetcher 1165 together with a hit or miss indicator from an appropriate and applicable cache without regard to the program order. The forwarded demand request is retained as an entry in the prefetcher training queue 1170 subject to a prefetcher training queue replacement algorithm. The retainment of the forwarded demand request in the entry can provide greater filtering range as demand requests for a same cache line tend to be close in time. The prefetcher 1165 does continue training on demand requests associated with a hit in that the instruction or data is already present and any such pattern based thereon has been prefetched. The prefetcher 1165 does not start training on demand requests associated with hit in that the instruction or data is already present and any such pattern based thereon would be wasteful.

The prefetcher training queue 1170 allocates entries upon receipt without regard to program order. Similarly, the prefetcher training queue 1170 forwards stored demand requests together with a hit or miss indicator without regard to the program order. The prefetcher training queue 1170 can process actions as received without regard to the program order, i.e., the prefetcher training queue 1170 implements out-of-order processing.

Figure 2:
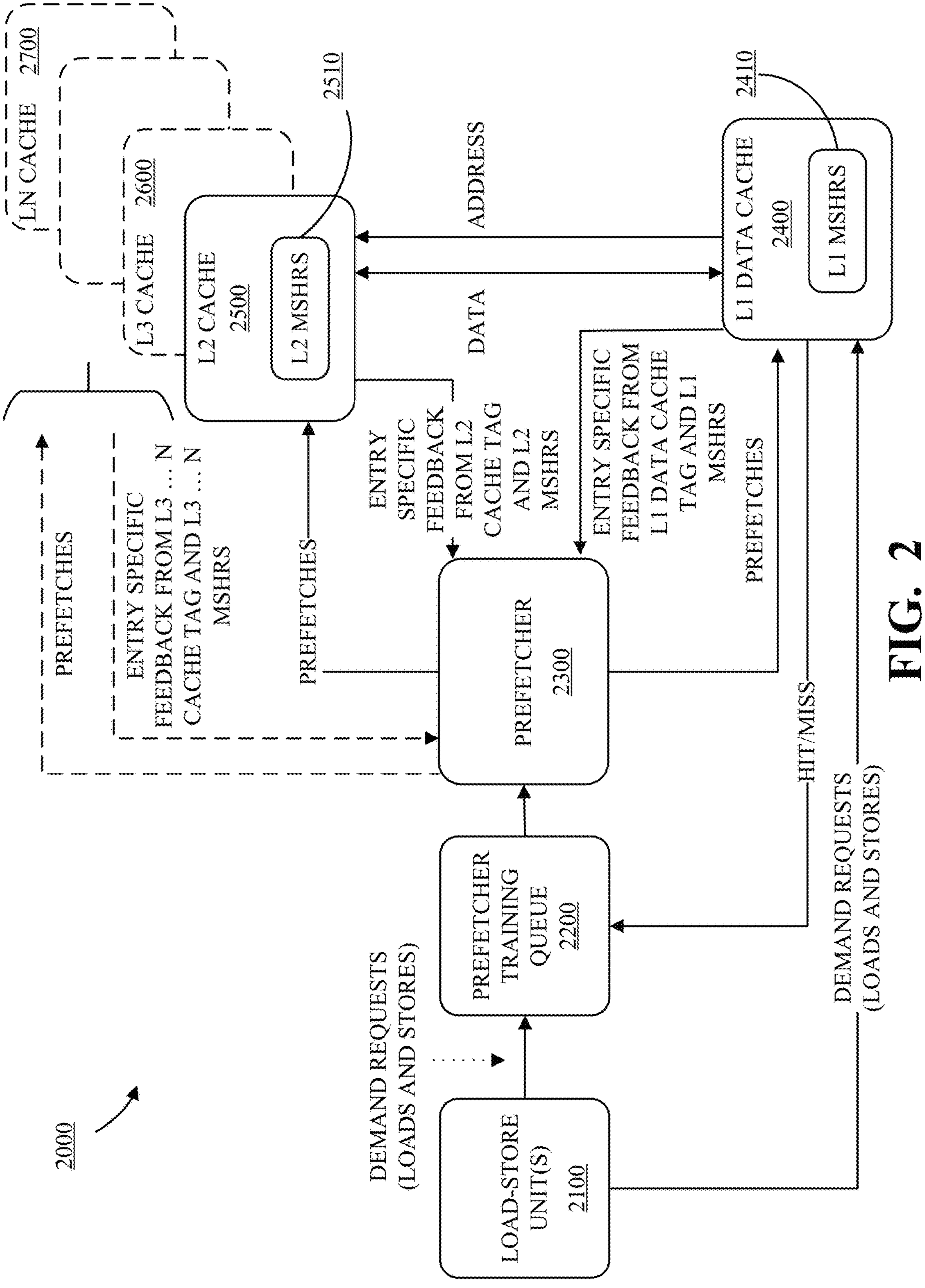
FIG. 2 is a block diagram of an example of a processing system for implementing a prefetcher with a filtered prefetcher training queue in accordance with embodiments of this disclosure.

FIG. 2 is a block diagram of an example of a processing system 2000 for implementing a prefetcher with a filtered prefetcher training queue in accordance with embodiments of this disclosure. The processing system 2000 can implement a pipelined architecture. The processing system 2000 can be configured to decode and execute instructions of an instruction set architecture (ISA) (e.g., a RISC-V instruction set). The instructions can execute speculatively and out-of-order in the processing system 2000. The processing system 2000 can be a compute device, a microprocessor, a microcontroller, or an IP core. The processing system 2000 can be implemented as an integrated circuit. The processing system 2000 can implement the methods or techniques described herein. The processing system 2000 can be implemented in the processing system 1000.

The processing system 2000 includes a load-store unit (LSU) 2100, a prefetcher training queue 2200, a prefetcher 2300, an L1 data cache 2400, an L2 cache 2500, a L3 cache 2600, and higher level (LN) caches 2700. The L1 data cache 2400, the L2 cache 2500, the L3 cache 2600, and the higher level (LN) caches 2700 can constitute a cache hierarchy for the processing system 2000. Each of the L1 data cache 2400, the L2 cache 2500, the L3 cache 2600, and the higher level (LN) caches 2700 can include miss status holding registers (MSHRs). For example, the L1 data cache 2400 includes L1 MSHRs 2410 and the L2 cache 2500 includes L2 MSHRs 2510. The number of MSHRs in each cache can be different. In some implementations, the number of L1 MSHRs is less than the number of L2 MSHRs.

In some implementations, the LSU 2100 is multiple load/store units with multiple load/store execution pipelines for providing demand requests. In some implementations, the LSU 2100 includes multiple load/store execution pipelines for providing demand requests. In some implementations, the demand requests are data requests, demand load requests, demand store requests, and the like.

In some implementations, the prefetcher 2300 is a core-integrated prefetcher. In some implementations, the prefetcher 2300 is a hardware prefetcher.

The prefetcher training queue 2200 can buffer multiple demand requests for training the prefetcher 2300. Missing a training event, i.e., a demand request, is minimized, mitigated, or avoided. In some implementations, the prefetcher training queue 2200 includes N entries for demand requests. In some implementations, the prefetcher training queue 2200 includes 8 entries for demand requests. The prefetcher training queue 2200 can receive hit and miss indicators from the L1 data cache 2400 when a demand request hits or misses an appropriate or applicable cache, respectively, as processed by the processing system 2000.

Operationally, the LSU(s) 2100 can send or provide one or more demand requests to the prefetcher training queue 2200 and to the L1 data cache 2400. In some implementations, multiple demand requests are provided in one clock cycle. The prefetcher training queue 2200 includes a filter mechanism which determines whether a received demand request matches a demand request which is stored in an entry in the prefetcher training queue 2200. The prefetcher training queue 2200 also ensures that the multiple demand requests are not duplicate with each other. The filtering mechanism can use one or more characteristics of a cache line, including but not limited, such as an address, to match demand requests. The filtering prevents the prefetcher 2300 from excessive training with respect to a cache line over multiple cycles. The filtering can reduce the size of the prefetcher training queue 2200 needed for effective prefetcher training. Matching or duplicative received demand requests are filtered out and deleted. The prefetcher training queue 2200 can allocate an entry for a new or non-duplicative received demand request.

The prefetcher training queue 2200 can receive hit or miss indicators from the appropriate and applicable caches for the stored demand requests. The prefetcher training queue 2200 releases, sends, or forwards a demand request entered in the prefetcher training queue 2200 to the prefetcher 2300 together with a hit or miss indicator from an appropriate and applicable cache. The forwarded demand request is retained as an entry in the prefetcher training queue 2200 subject to a prefetcher training queue replacement algorithm. The retainment of the forwarded demand request in the entry can provide greater filtering range as demand requests for a same cache line tend to be close in time. The prefetcher 2300 does continue training on demand requests associated with a hit in that the instruction or data is already present and any such pattern based thereon has been prefetched. The prefetcher 2300 does not start training on demand requests associated with a hit in that the instruction or data is already present and any such pattern based thereon would be wasteful. The prefetcher 2300, the L1 data cache 2400, the L2 cache 2500, the L3 cache 2600, and the higher level (LN) caches 2700 interact and process demand requests, prefetches, and inter-cache messages (data and address) based on hits and misses and respective MSHR information.

The prefetcher training queue 2200 allocates entries upon receipt without regard to program order. Similarly, the prefetcher training queue 2200 forwards stored demand requests without regard to the program order. The prefetcher training queue 2200 can process actions as received without regard to the program order, i.e., the prefetcher training queue 2200 implements out-of-order processing.

Figure 3:
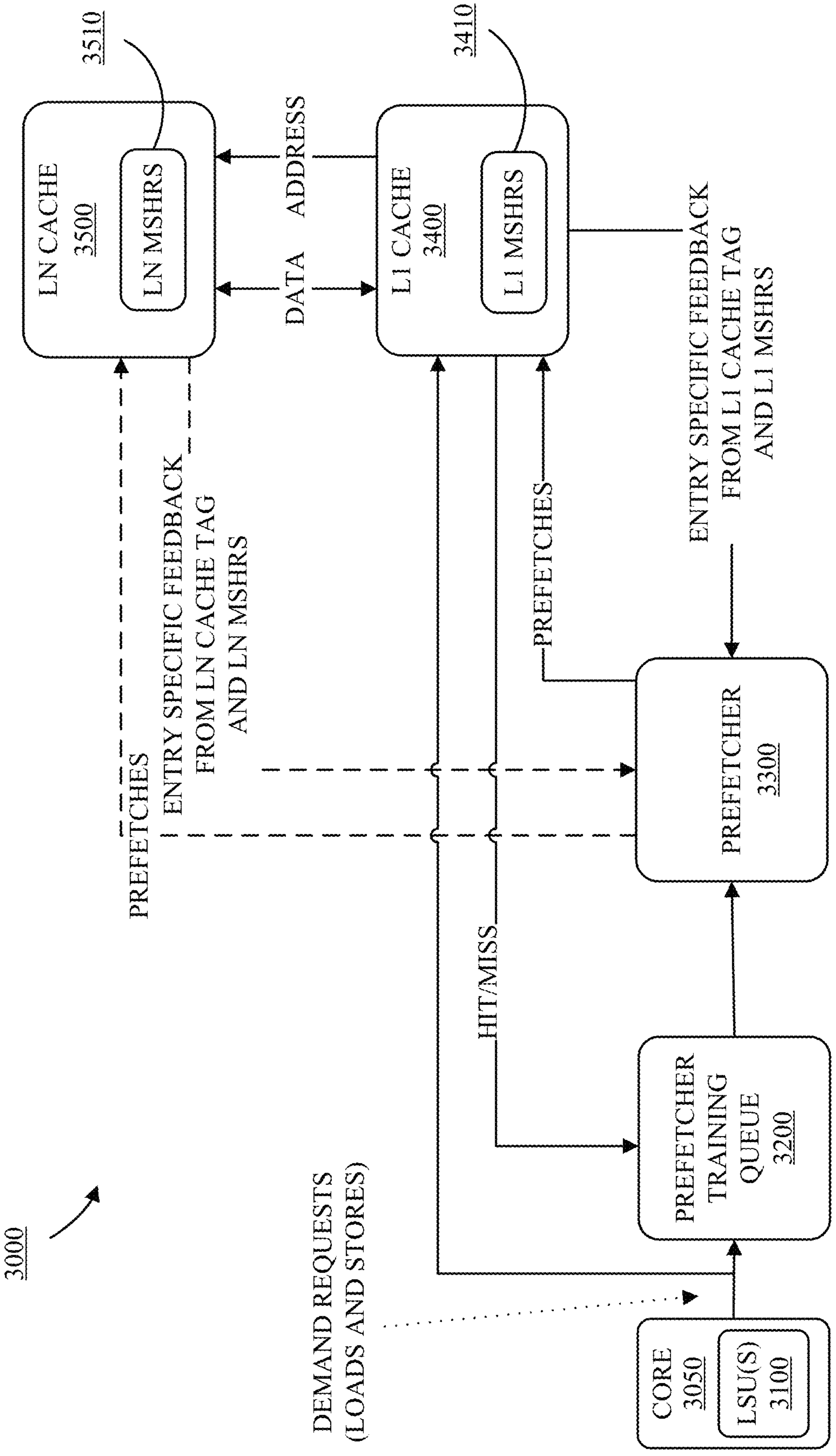
FIG. 3 is a block diagram of an example of a processing system for implementing a prefetcher with a filtered prefetcher training queue in accordance with embodiments of this disclosure.

FIG. 3 is a block diagram of an example of a processing system 3000 for implementing a prefetcher with a filtered prefetcher training queue in accordance with embodiments of this disclosure. The processing system 3000 can implement a pipelined architecture. The processing system 3000 can be configured to decode and execute instructions of an instruction set architecture (ISA) (e.g., a RISC-V instruction set). The instructions can execute speculatively and out-of-order in the processing system 3000. The processing system 3000 can be a compute device, a microprocessor, a microcontroller, or an IP core. The processing system 3000 can be implemented outside or external a core as described herein. The processing system 3000 can implement the methods or techniques described herein. The processing system 3000 can be implemented in the processing system 1000.

The processing system 3000 includes a core 3050, which includes a load-store unit (LSU) 3100. The processing system 3000 further includes a prefetcher training queue 3200, a prefetcher 3300, an L1 cache 3400, and higher level (LN) caches 3500. In some implementations, the prefetcher 2300 is a hardware prefetcher. The L1 cache 3400 and the higher level (LN) caches 3500 can constitute a cache hierarchy for the processing system 3000. Each of the L1 cache 3400 and the higher level (LN) caches 3500 can include miss status holding registers (MSHRs). For example, the L1 cache 3400 includes L1 MSHRs 3410 and the higher level (LN) caches 3500 includes LN MSHRs 3510. The number of MSHRs in each cache can be different.

In some implementations, the LSU 3100 is multiple load/store units with multiple load/store execution pipelines for providing demand requests. In some implementations, the LSU 3100 includes multiple load/store execution pipelines for providing demand requests. In some implementations, the demand requests are data requests, demand load requests, demand store requests, and the like.

The prefetcher training queue 3200 can buffer multiple demand requests for training the prefetcher 3300. Missing a training event, i.e., a demand request, is minimized, mitigated, or avoided. In some implementations, the prefetcher training queue 3200 includes N entries for demand requests. In some implementations, the prefetcher training queue 3200 includes 8 entries for demand requests. The prefetcher training queue 3200 can receive hit and miss indicators from the L1 cache 3400 when a demand request hits or misses an appropriate or applicable cache, respectively, as processed by the processing system 3000.

Operationally, the LSU(s) 3100 can send or provide one or more demand requests to the prefetcher training queue 3200 and to the L1 cache 3400. In some implementations, multiple demand requests are provided in one clock cycle. The prefetcher training queue 3200 includes a filter mechanism which determines whether a received demand request matches a demand request which is stored in an entry in the prefetcher training queue 3200. The prefetcher training queue 3200 also ensures that the multiple demand requests are not duplicate with each other. The filtering mechanism can use one or more characteristics of a cache line, including but not limited, such as an address, to match demand requests. The filtering prevents the prefetcher 3300 from excessive training with respect to a cache line over multiple cycles. The filtering can reduce the size of the prefetcher training queue 3200 needed for effective prefetcher training. Matching or duplicative received demand requests are filtered out and deleted. The prefetcher training queue 3200 can allocate an entry for a new or non-duplicative received demand request.

The prefetcher training queue 3200 can receive hit or miss indicators from the appropriate and applicable caches for the stored demand requests. The prefetcher training queue 3200 releases, sends, or forwards a demand request entered in the prefetcher training queue 3200 to the prefetcher 3300 together with a hit or miss indicator from an appropriate and applicable cache. The forwarded demand request is retained as an entry in the prefetcher training queue 3200 subject to a prefetcher training queue replacement algorithm. The retainment of the forwarded demand request in the entry can provide greater filtering range as demand requests for a same cache line tend to be close in time. The prefetcher 3300 does continue training on demand requests associated with a hit in that the instruction or data is already present and any such pattern based thereon has been prefetched. The prefetcher 3300 does not start training on demand requests associated with a hit in that the instruction or data is already present and any such pattern based thereon would be wasteful. The prefetcher 3300, the L1 cache 3400, and the higher level (LN) caches 3500 interact and process demand requests, prefetches, and inter-cache messages (data and address) based on hits and misses and respective MSHR information.

The prefetcher training queue 3200 allocates entries upon receipt without regard to program order. Similarly, the prefetcher training queue 3200 forwards stored demand requests without regard to the program order. The prefetcher training queue 3200 can process actions as received without regard to the program order, i.e., the prefetcher training queue 3200 implements out-of-order processing.

Figure 4:
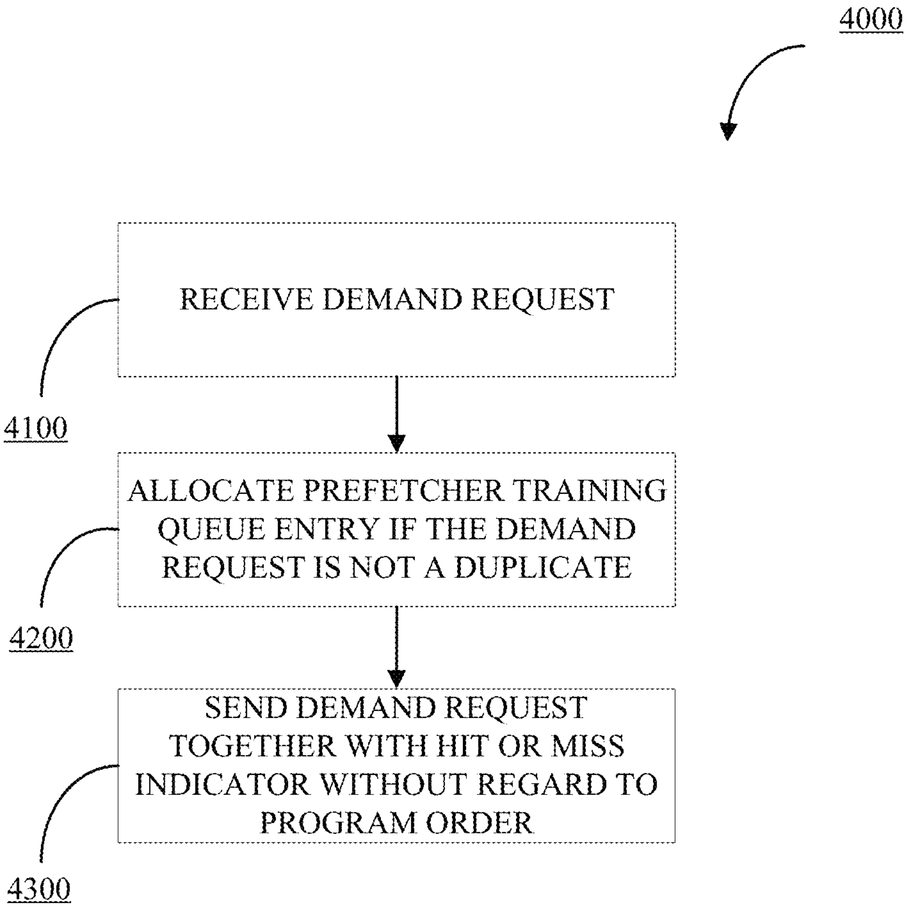
FIG. 4 is a flowchart of an example technique for implementing a prefetcher with a filtered prefetcher training queue in accordance with embodiments of this disclosure.

FIG. 4 is a flowchart of an example technique 4000 for implementing a prefetcher with a filtered prefetcher training queue in accordance with embodiments of this disclosure. The technique 4000 includes: receiving 4100 a demand request; allocating 4200 a prefetcher training queue entry if the demand request is not a duplicate; and sending 4300 a stored demand request together with a hit or miss. The technique 4000 can be implemented, for example, in the processing system 1000 of FIG. 1, the processing system 2000 of FIG. 2, the processing system 3000 of FIG. 3 and like devices and systems.

The technique 4000 includes receiving 4100 a demand request. A core or a load-store unit can send demand requests toward a cache hierarchy or cache to access instructions or data. The demand requests are further directed towards a prefetcher, via a prefetcher training queue, to train the prefetcher to establish access patterns and send prefetches to obtain instructions or data and store in the cache hierarchy or cache.

The technique 4000 includes allocating 4200 a prefetcher training queue if the demand request is not a duplicate. The prefetcher training queue buffers multiple demand requests from one or more load-store pipes (as implemented by the core or load-store unit) as the prefetcher processes a demand request. The prefetcher training queue filters incoming demand requests against stored demand requests to eliminate duplicative demand requests, i.e., demand requests associated with a same cache line. Non-matching demand requests are allocated an entry in the prefetcher training queue.

The technique 4000 includes sending 4300 a stored demand request together with a hit or miss. The prefetcher receives demand requests stored in the prefetcher training queue together with a hit or miss indicator. The prefetcher processes the received stored demand request. The prefetcher training queue maintains sent stored demand requests in the prefetcher training queue subject to a replacement algorithm employed by the prefetcher training queue. Entries in the prefetcher training queue are replaced pursuant to a replacement algorithm. The prefetcher training queue acts upon each incoming demand request in receipt order without regard to program order. The prefetcher training queue acts upon each miss or hit indicator without regard to program order. The prefetcher training queue operates out-of-order with respect to program order.

Figure 5:
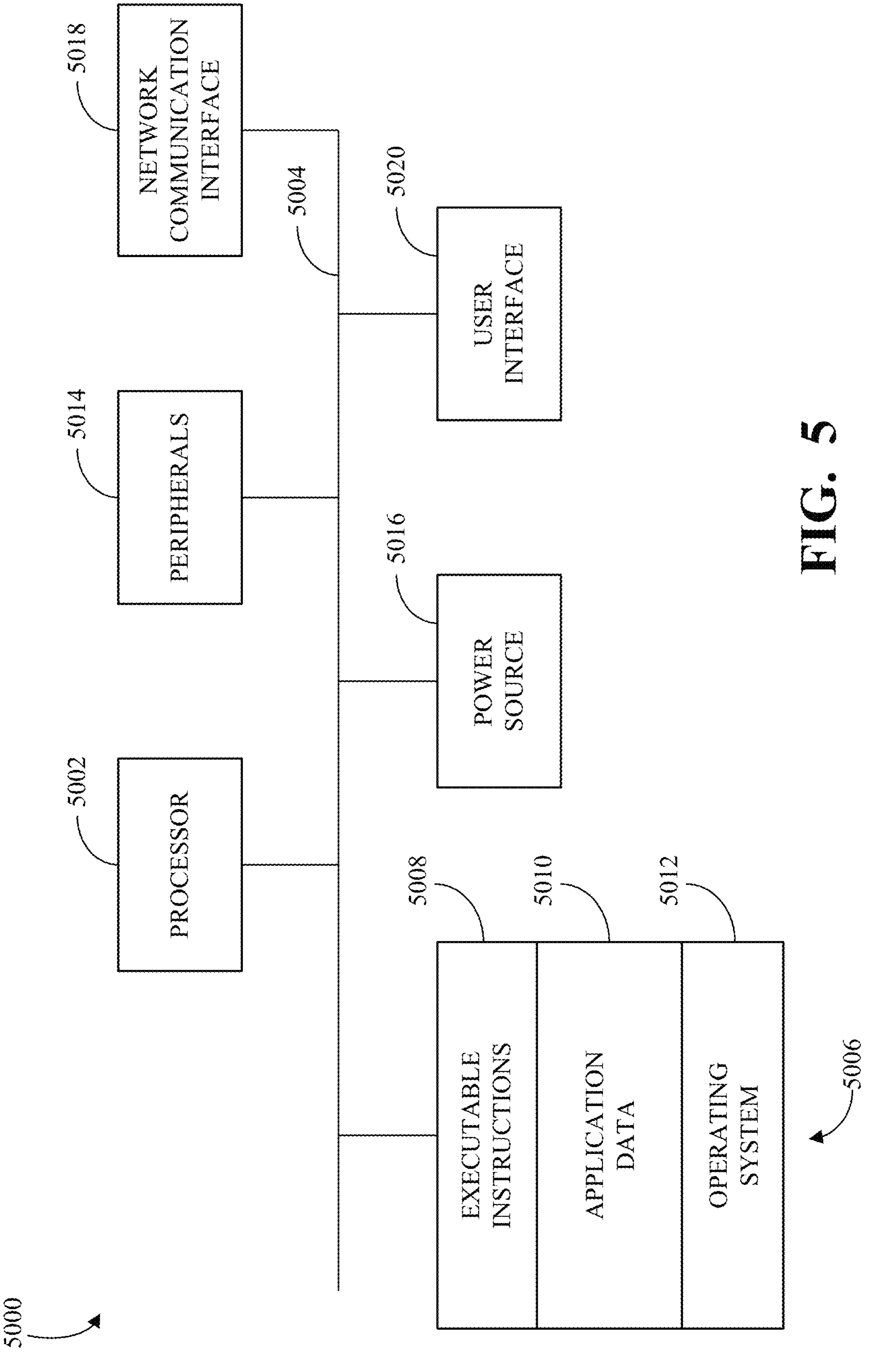
FIG. 5 is a block diagram of an example of a system for facilitating generation of a circuit representation.

FIG. 5 is a block diagram of an example of a system 5000 for facilitating generation of a circuit representation, and/or for programming or manufacturing an integrated circuit. The system 5000 is an example of an internal configuration of a computing device. For example, the system 5000 may be used to generate a file that generates a circuit representation of an integrated circuit including a processor core (e.g., the processing system 1000, the processing system 2000 and/or the processing system 3000). The system 5000 can include components or units, such as a processor 5002, a bus 5004, a memory 5006, peripherals 5014, a power source 5016, a network communication interface 5018, a user interface 5020, other suitable components, or a combination thereof.

The processor 5002 can be a central processing unit (CPU), such as a microprocessor, and can include single or multiple processors having single or multiple processing cores. Alternatively, the processor 5002 can include another type of device, or multiple devices, now existing or hereafter developed, capable of manipulating or processing information. For example, the processor 5002 can include multiple processors interconnected in any manner, including hardwired or networked, including wirelessly networked. In some implementations, the operations of the processor 5002 can be distributed across multiple physical devices or units that can be coupled directly or across a local area or other suitable type of network. In some implementations, the processor 5002 can include a cache, or cache memory, for local storage of operating data or instructions.

The memory 5006 can include volatile memory, non-volatile memory, or a combination thereof. For example, the memory 5006 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 5006 can include another type of device, or multiple devices, now existing or hereafter developed, capable of storing data or instructions for processing by the processor 5002. The processor 5002 can access or manipulate data in the memory 5006 via the bus 5004. Although shown as a single block in FIG. 5, the memory 5006 can be implemented as multiple units. For example, a system 5000 can include volatile memory, such as random access memory (RAM), and persistent memory, such as a hard drive or other storage.

The memory 5006 can include executable instructions 5008, data, such as application data 5010, an operating system 5012, or a combination thereof, for immediate access by the processor 5002. The executable instructions 5008 can include, for example, one or more application programs, which can be loaded or copied, in whole or in part, from non-volatile memory to volatile memory to be executed by the processor 5002. The executable instructions 5008 can be organized into programmable modules or algorithms, functional programs, codes, code segments, or combinations thereof to perform various functions described herein. For example, the executable instructions 5008 can include instructions executable by the processor 5002 to cause the system 5000 to automatically, in response to a command, generate an integrated circuit design and associated test results based on a design parameters data structure. The application data 5010 can include, for example, user files, database catalogs or dictionaries, configuration information or functional programs, such as a web browser, a web server, a database server, or a combination thereof. The operating system 5012 can be, for example, Microsoft Windows®, macOS®, or Linux®; an operating system for a small device, such as a smartphone or tablet device; or an operating system for a large device, such as a mainframe computer. The memory 5006 can comprise one or more devices and can utilize one or more types of storage, such as solid-state or magnetic storage.

The peripherals 5014 can be coupled to the processor 5002 via the bus 5004. The peripherals 5014 can be sensors or detectors, or devices containing any number of sensors or detectors, which can monitor the system 5000 itself or the environment around the system 5000. For example, a system 5000 can contain a temperature sensor for measuring temperatures of components of the system 5000, such as the processor 5002. Other sensors or detectors can be used with the system 5000, as can be contemplated. In some implementations, the power source 5016 can be a battery, and the system 5000 can operate independently of an external power distribution system. Any of the components of the system 5000, such as the peripherals 5014 or the power source 516, can communicate with the processor 5002 via the bus The network communication interface 5018 can also be coupled to the processor 5002 via the bus 5004. In some implementations, the network communication interface 5018 can comprise one or more transceivers. The network communication interface 5018 can, for example, provide a connection or link to a network, via a network interface, which can be a wired network interface, such as Ethernet, or a wireless network interface. For example, the system 5000 can communicate with other devices via the network communication interface 5018 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 5020 can include a display; a positional input device, such as a mouse, touchpad, touchscreen, or the like; a keyboard; or other suitable human or machine interface devices. The user interface 5020 can be coupled to the processor 5002 via the bus 5004. Other interface devices that permit a user to program or otherwise use the system 5000 can be provided in addition to or as an alternative to a display. In some implementations, the user interface 520 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 5014. The operations of the processor 5002 can be distributed across multiple clients or servers, which can be coupled directly or across a local area or other suitable type of network. The memory 5006 can be distributed across multiple clients or servers, such as network-based memory or memory in multiple clients or servers performing the operations of clients or servers. Although depicted here as a single bus, the bus 5004 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming. In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

In implementations, a processing system includes a prefetcher and a prefetcher training queue connected to the prefetcher. The prefetcher training queue configured to receive one or more demand requests from one or more load-store units, allocate a prefetcher training queue entry for a non-duplicative demand request, and send, to the prefetcher, a stored demand request together with a hit or miss indicator, wherein the prefetcher training queue sends stored demand requests without regard to program order.

In some implementations, the prefetcher training queue allocates a prefetcher training queue entry for the non-duplicative demand request without regard to program order. In some implementations, the prefetcher training queue further configured to retain sent stored demand requests in the prefetcher training queue. In some implementations, the prefetcher training queue further configured to replace sent stored demand requests in accordance with a prefetcher training queue replacement algorithm. In some implementations, the prefetcher training queue further configured to compare received demand requests against each other to filter out duplicative demand requests. In some implementations, the prefetcher training queue further configured to compare a received demand request against stored demand requests in the prefetcher training queue to determine whether the received demand request is non-duplicative. In some implementations, the comparison is based on an address associated with the received demand request.

In implementations, a method for out-of-order prefetcher training queue processing includes receiving, by a prefetcher training queue, demand requests from load-store pipes, allocating, by the prefetcher training queue, an entry for a non-duplicative demand request, and forwarding, to a prefetcher, a stored demand request together with a hit or miss indicator, wherein the forwarding is performed without regard to program order.

In some implementations, the allocating is performed without regard to program order. In some implementations, the method further includes maintaining entries in the prefetcher training queue for forwarded stored demand requests. In some implementations, the method further includes replacing entries in the prefetcher training queue in accordance with a prefetcher training queue replacement algorithm. In some implementations, the method further includes comparing received demand requests against each other to filter out duplicative demand requests. In some implementations, the method further includes matching a received demand request against stored demand requests in the prefetcher training queue to determine whether the received demand request is non-duplicative. In some implementations, the matching is based on an address associated with the received demand request.

In implementations, a prefetcher training queue includes N entries, the prefetcher training queue configured to receive demand requests from a core, allocate a prefetcher training queue entry for a non-duplicative demand request, and send, to a prefetcher, a stored demand request together with a hit or miss indicator, wherein the prefetcher training queue sends stored demand requests without regard to program order.

In some implementations, the prefetcher training queue allocates a prefetcher training queue entry for the non-duplicative demand request without regard to program order. In some implementations, the method further includes prefetcher training queue is further configured to retain sent stored demand requests in the prefetcher training queue. In some implementations, the method further includes prefetcher training queue is further configured to replace sent stored demand requests in accordance with a prefetcher training queue replacement algorithm. In some implementations, the method further includes prefetcher training queue is further configured to compare received demand requests against each other to filter out duplicative demand requests. In some implementations, the method further includes prefetcher training queue is further configured to compare a received demand request against stored demand requests in the prefetcher training queue to determine whether the received demand request is non-duplicative.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A processing system comprising:

a prefetcher; and a prefetcher training queue connected to the prefetcher, the prefetcher training queue configured to:

receive one or more demand requests from one or more load-store units;

store non-duplicative demand requests, wherein at least two of the non-duplicative demand requests are received out of order instead of program order and are stored in the prefetcher training queue in an order of being received instead of the program order and without being reordered, wherein the at least two of the non-duplicative demand requests are non-conforming to the program order absent reordering in the prefetcher training queue;

allocate a prefetcher training queue entry for a stored non-duplicative demand request; and send, to the prefetcher, the stored non-duplicative demand request together with a hit or miss indicator, wherein the prefetcher training queue sends stored non-duplicative demand requests to the prefetcher without regard to the program order.

2. The processing system of claim 1, wherein the prefetcher training queue allocates a prefetcher training queue entry for the stored non-duplicative demand request without regard to the program order.

3. The processing system of claim 1, the prefetcher training queue further configured to:

retain sent stored demand requests in the prefetcher training queue.

4. The processing system of claim 3, the prefetcher training queue further configured to:

replace one or more of the sent stored demand requests in accordance with a prefetcher training queue replacement algorithm.

5. The processing system of claim 1, the prefetcher training queue further configured to:

compare received demand requests against each other to filter out duplicative demand requests.

6. The processing system of claim 1, the prefetcher training queue further configured to:

compare a received demand request against stored demand requests in the prefetcher training queue to determine whether the received demand request is non-duplicative.

7. The processing system of claim 6, wherein the comparison is based on an address associated with the received demand request.

8. The processing system of claim 1, wherein the stored non-duplicative demand requests are sent to the prefetcher such that the prefetcher receives the stored non-duplicative demand requests according to the order of being received.

9. A method for out-of-order prefetcher training queue processing, the method comprising:

receiving, by a prefetcher training queue, demand requests from load-store pipes;

storing non-duplicative demand requests, wherein at least two of the non-duplicative demand requests are received out of order instead of program order and are stored in the prefetcher training queue in an order of being received instead of the program order and without being reordered, wherein the at least two of the non-duplicative demand requests are non-conforming to the program order absent reordering in the prefetcher training queue;

allocating, by the prefetcher training queue, an entry for a stored non-duplicative demand request; and forwarding, to a prefetcher, the stored non-duplicative demand request together with a hit or miss indicator, wherein the forwarding is performed without regard to program order.

10. The method of claim 9, wherein the allocating is performed without regard to the program order.

11. The method of claim 9, further comprising:

maintaining entries in the prefetcher training queue for forwarded stored demand requests.

12. The method of claim 11, further comprising:

replacing one or more of the entries in the prefetcher training queue in accordance with a prefetcher training queue replacement algorithm.

13. The method of claim 9, further comprising:

comparing received demand requests against each other to filter out duplicative demand requests.

14. The method of claim 9, further comprising:

matching a received demand request against stored demand requests in the prefetcher training queue to determine whether the received demand request is non-duplicative.

15. The method of claim 14, wherein the matching is based on an address associated with the received demand request.

16. A prefetcher training queue comprising:

N entries, the prefetcher training queue configured to:

receive demand requests from a core;

store non-duplicative demand requests, wherein at least two of the non-duplicative demand requests are received out of order instead of program order and are stored in the prefetcher training queue in an order of being received instead of the program order and without being reordered, wherein the at least two of the non-duplicative demand requests are non-conforming to the program order absent reordering in the prefetcher training queue;

allocate a prefetcher training queue entry for a stored non-duplicative demand request; and send, to a prefetcher, the stored non-duplicative demand request together with a hit or miss indicator, wherein the prefetcher training queue sends stored non-duplicative demand requests to the prefetcher without regard to program order.

17. The prefetcher training queue of claim 16, wherein the prefetcher training queue allocates a prefetcher training queue entry for the stored non-duplicative demand request without regard to the program order.

18. The prefetcher training queue of claim 16, further configured to:

retain sent stored demand requests in the prefetcher training queue.

19. The prefetcher training queue of claim 18, further configured to:

replace one or more of the sent stored demand requests in accordance with a prefetcher training queue replacement algorithm.

20. The prefetcher training queue of claim 16, further configured to:

compare received demand requests against each other to filter out duplicative demand requests.

* * * * *